(12) United States Patent
Mori et al.

(10) Patent No.: US 8,425,679 B2
(45) Date of Patent: Apr. 23, 2013

(54) CALCIUM FERROALUMINATE COMPOUND, CEMENT ADMIXTURE AND ITS MANUFACTURING METHODS, AND CEMENT COMPOSITION

(75) Inventors: Taiichiro Mori, Itoigawa (JP); Kazuto Tabara, Itoigawa (JP); Kenji Yamamoto, Itoigawa (JP); Minoru Morioka, Tokyo (JP); Takayuki Higuchi, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/581,573

(22) PCT Filed: Nov. 25, 2010

(86) PCT No.: PCT/JP2010/070972
§ 371 (c)(1),
(2), (4) Date: Aug. 28, 2012

(87) PCT Pub. No.: WO2011/108159
PCT Pub. Date: Sep. 9, 2011

(65) Prior Publication Data
US 2012/0318172 A1    Dec. 20, 2012

(30) Foreign Application Priority Data
Mar. 1, 2010    (WO) .................. PCT/JP2010/053270

(51) Int. Cl.
C04B 28/06    (2006.01)
C04B 14/36    (2006.01)
C04B 7/32    (2006.01)
C04B 22/08    (2006.01)
C01F 7/16    (2006.01)
C01G 49/00    (2006.01)

(52) U.S. Cl.
USPC ........... 106/692; 106/693; 106/694; 106/695; 423/594.2; 423/600

(58) Field of Classification Search .................. 106/692, 106/693, 694, 695, 819; 423/594.2, 600
See application file for complete search history.

(56) References Cited

FOREIGN PATENT DOCUMENTS

| JP | S47-35020 | 11/1972 |
|---|---|---|
| JP | S53-3423 | 1/1978 |
| JP | H01-103970 | 4/1989 |
| JP | 8-253354 A | * 10/1996 |
| JP | 2005-104828 | 4/2005 |
| JP | 2007-153714 | 6/2007 |
| JP | 2008-246478 | 10/2008 |
| JP | 2010-100473 | 5/2010 |
| JP | 2010-155737 | 7/2010 |

OTHER PUBLICATIONS

Minoru Morioka, "CaO-2Al$_2$O$_3$ no Enkabutsu Ion no Kakusan Yokusei Koka", Dai 63 Kai Cement Gijutsu Taikai Koen Yoshi 2009, Apr. 30, 2009, pp. 116=117.

* cited by examiner

Primary Examiner — Anthony J Green
(74) Attorney, Agent, or Firm — Manabu Kanesaka (57) ABSTRACT

It is the object of the invention to provide a cement admixture, and a cement composition that can impart good enough rust-proofness to reinforcing bars in hardened cement concrete, and can have resistance to penetration of chloride ions entering from the outside, prevent the hardened cement concrete from getting porous due to reduced leaching of Ca ions and have a self-recovery capability.

The invention provides a cement admixture characterized by containing a calcium ferroaluminate compound comprising a CaO—Al$_2$O$_3$—Fe$_2$O$_3$ system, and having a Fe$_2$O$_3$ content of 0.5 to 15% by mass and a CaO.2Al$_2$O$_3$ structure with a CaO/Al$_2$O$_3$ molar ratio ranging from 0.15 to 0.7. It is preferable that the fineness is 2,000 to 7,000 cm2/g as represented in terms of the Blaine's specific surface area value; the potentially hydraulic substance and/or pozzolan substance (pozzolan substance or the like) is also used; the pozzolan substance or the like contains one or two or more selected from the group consisting of finely pulverized, quenched, granulated blast-furnace slag, fly ash, silica fume, metakaolin, incinerated pulp sludge ash, incinerated sewage sludge ash, and waste glass powder; and the blending proportion of the calcium ferroaluminate compound to the pozzolan substance or the like ranges from 10/1 to 1/10 by mass. The invention also provides a cement composition containing cement and the cement admixture.

8 Claims, 1 Drawing Sheet

CALCIUM FERROALUMINATE COMPOUND, CEMENT ADMIXTURE AND ITS MANUFACTURING METHODS, AND CEMENT COMPOSITION

RELATED APPLICATIONS

The present application is National Phase of International Application No. PCT/JP2010/070972 filed Nov. 25, 2010, and claims priority from PCT Application No. PCT/JP2010/053270 filed Mar. 1, 2010.

BACKGROUND OF THE INVENTION

1. Field of the Invention

The present invention relates primarily to a cement admixture and a cement composition used in the civil engineering and construction fields.

2. Description of the Prior Art

Calcium aluminoferrite has been well known as a CaO—$Al_2O_3$—$Fe_2O_3$ based compound used for cement admixtures. The calcium aluminoferrite known so far in the art includes $4CaO.Al_2O_3.Fe_2O_3$ ($C_4AF$), $6CaO.2Al_2O_3.Fe_2O_3$ ($C_6A_2F$), and $6CaO.Al_2O_3.2Fe_2O_3$ ($C_6AF_2$).

These calcium aluminoferrites have a crystal structure of $2CaO.Fe_2O_3$ ($C_2F$) that is a sort of calcium ferrite. In short, they keep a $C_2F$ crystal structure although a large amount of $Al_2O_3$ is solid-solubilized in $C_2F$, and take a variety of $Al_2O_3/Fe_2O_3$ molar ratios in terms of composition. The $C_2F$ crystal structure is an orthorhombic system where a=5.32 Å, b=14.48 Å and c=5.51 Å with a unit lattice volume of 424.95 Å$^3$.

On the other hand, $CaO.2Al_2O_3$ ($CA_2$) has been known as a sort of calcium aluminate. The crystal structure of $CA_2$ is a monoclinic system where a=12.89 Å, b=8.88 Å and c=5.45 Å with a unit lattice volume of 596.41 Å$^3$.

Thus, $C_2F$ and $CA_2$ have quite different crystal structures, and never until now is any compound with a $Fe_2O_3$ component solid-solubilized in $CA_2$ known in the art.

By the way, there has recently been mounting demand for improvements in the durability of concrete structures in the civil engineering and construction fields.

One factor of degradation of concrete structures is damage caused by salt where reinforcing bars (rebars) corrode visibly in the presence of chloride ions, and to hold back that damage, there is a method for imparting resistance to penetration of chloride ions to concrete structures.

In order to keep chloride ions from penetrating into a concrete structure thereby imparting resistance to penetration of chloride ions to it, there is a method of reducing water/cement ratios known in the art (see Non-Patent Publication 1). However, the method of reducing water/cement' ratios is not only detrimental to workability but may also provide no drastic measure.

There has also been a method of using a cement admixture composed mainly of $CaO.2Al_2O_3$ and gypsum and further containing an inorganic chloride for the purpose of imparting early strength to cement concrete and preventing corrosion of rebars (see Patent Publication 1).

In addition, there has been a method of using a cement admixture containing calcium aluminate having a CaO/$Al_2O_3$ molar ratio of 0.3 to 0.7 and a Blaine's specific surface area of 2,000 to 6,000 cm$^2$/g thereby making sure good resistance to penetration of chloride ions and preventing temperature cracking of mass concrete (see Patent Publication 2). A problem with this cement admixture is, however, that a rapid-hardening feature appears in high-temperature environments with detrimental to the workability of cement concrete mixed with it. For instance, the rapid-hardening feature would not only appear in regions where high temperatures prevail and Chloride Attack and acidic degradation are accelerated such as Okinawa at home and Singapore abroad, but it has also emerged through numerous studies made by the inventors that the resistance to penetration of chloride ions is not fully exerted. Thus, there is still expectation of the development of a rustproofing technology that works more effectively in high-temperature environments where the diffusion speed of corrosive components is high and corrosion reactions are accelerated.

On the other hand, cement compositions mixed with finely pulverized, quenched, granulated blast-furnace slag and pozzolan substances have been known to make improvements in the resistance to penetration of chloride ions. Why they inhibit the penetration of chloride ions is that the Al component in the finely pulverized, quenched, granulated blast-furnace slag contributes to chemical fixation, or electrical absorption, of chloride ions. Referring here to reductions of calcium hydroxide in hardened cement, the pozzolan substances would appear to reduce voids of a few tens to a few hundred of micrometers that are otherwise formed in the case where calcium hydroxide is leached out in seawater. However, the reactions of finely pulverized, quenched, granulated blast-furnace slag and pozzolan substances tend to take place over an extended period of time, impeding the development of initial strength, and giving rise to a problem that as they are immersed in seawater in an early material age, it causes the resistance to penetration of chloride ions to go down, resulting in degradation of concrete. In order to improve durability, viz., seawater resistance, it is thus required to accelerate reactions in hardened cement, thereby reducing penetration of chloride ions under the action of seawater from an early material age.

On the other hand, there has also been a method for adding nitrites or the like proposed for the purpose of prevention rusting of rebars (see Patent Publications 3 and 4). However, the nitrites have been found to have no effect on acid resistance at all.

LISTING OF THE PRIOR ARTS

Patent Publications

Patent Publication 1: JP(A) 47-035020
Patent Publication 2: JP(A) 2005-104828
Patent Publication 3: JP(A) 53-003423
Patent Publication 4: JP(A) 01-103970

Non-Patent Publications

Non-Patent Publication 1: "Durability Series for Concrete Structures, Chloride Attack (I)" edited by K. Kishitani, N. Nishizawa, etc., Gihodobook, pp. 34-37, May 1986

SUMMARY OF THE INVENTION

Providing a solution to such problems as described above, the present invention has for its purpose the provision of a cement admixture that can impart good rustproofness to rebars in hardened cement concrete even in high-temperature environments, has resistance to penetration of chloride ions entering from the outside into the hardened cement concrete, keeps the hardened cement concrete from getting porous because of less leaching of Ca ions out of the hardened cement concrete, and has a self-recovery capability enabling cracks to be recovered on their own, its manufacturing method, and a cement composition containing that cement admixture.

To achieve the aforesaid object, the present invention is embodied as follows.

(1) A calcium ferroaluminate compound, comprising a CaO—Al$_2$O$_3$—Fe$_2$O$_3$ system, and having a Fe$_2$O$_3$ content of 0.5 to 15% by mass and a CaO.2Al$_2$O$_3$ structure.

(2) A cement admixture, characterized by containing a calcium ferroaluminate as recited in (1), wherein the CaO/Al$_2$O$_3$ molar ratio ranges from 0.15 to 0.7.

(3) A cement admixture as recited in (2), which has a fineness of 2,000 to 7,000 cm$^2$/g as represented in terms of a Blaine's specific surface area value.

(4) A cement admixture as recited in (2) or (3), which further contains a potentially hydraulic substance and/or a pozzolan substance.

(5) A cement admixture as recited in (4), wherein said potentially hydraulic substance and/or said pozzolan substance contain one or two or more selected from the group consisting of finely pulverized, quenched, granulated blast-furnace slag, fly ash, silica fume, metakaolin, incinerated pulp sludge ash, incinerated sewage sludge ash, and waste glass powder.

(6) A cement admixture as recited in (4) or (5), wherein said calcium ferroaluminate and said potentially hydraulic substance and/or said pozzolan substance are blended together in a blending proportion of 10/1 to 1/10 by mass.

(7) A method for manufacturing a cement admixture, characterized in that a CaO-containing raw material, an Al$_2$O$_3$-containing raw material and an iron-containing raw material are blended together such that a CaO/Al$_2$O$_3$ molar ratio ranges from 0.15 to 0.7 and an Fe$_2$O$_3$ content ranges from 0.5% to 15% by mass, and heat treated at 1,400° C. to 1,600° C. inclusive to obtain a clinker, and said clinker is pulverized down to a Blaine's specific surface area value ranging from 2,000 to 7,000 cm$^2$/g.

(8) A cement composition, which contains cement and a cement admixture as recited in any one of (1) to (6).

ADVANTAGES OF THE INVENTION

The inventive cement admixture has some considerable advantages: it makes sure sufficient work times even in high-temperature environments, ensures a good rustproofing feature (rustproofness) combined with resistance to penetration of chloride ions entering from the outside, and keeps the hardened cement concrete from becoming porous due to less leaching of Ca ions out of it.

BEST MODE FOR CARRYING OUT THE INVENTION

The present invention will now be explained in greater details.

It is to be noted that unless otherwise specified, the "part(s)" and "%" are given on a mass basis.

It is also to be noted that the "cement concrete" referred herein is a generic term for cement pastes, cement mortars, and concretes.

Through numerous experiments, the inventors have found that the Fe$_2$O$_3$ component can be solid-solubilized in CA$_2$, and revealed that this solid solution still keeps the CA$_2$ structure intact, providing a compound quite different from calcium aluminoferrites such as C$_4$AF, C$_6$A$_2$F, and C$_6$AF$_2$ in terms of composition and crystal structure. The compound having Fe$_2$O$_3$ solid-solubilized in CA$_2$ while keeping the crystal structure of CA$_2$ intact is called the calcium ferroaluminate.

The calcium ferroaluminate compound (hereinafter referred to as the CFA compound) used herein is a generic term for compounds composed primarily of CaO, Al$_2$O$_3$ and Fe$_2$O$_3$ and obtained by mixing together raw materials containing calcia, alumina, ferrite, etc. and firing the resultant mixture in a kiln, fusing it in an electric furnace or otherwise heat treating it.

Referring here to the composition of the CFA compound, it has a CaO/Al$_2$O$_3$ molar ratio of 0.15 to 0.7 and a Fe$_2$O$_3$ content of 0.5 to 15%. More preferably, the CaO/Al$_2$O$_3$ molar ratio should be 0.4 to 0.6. At less than 0.15, no sufficient resistance to penetration of chloride ions may often be obtained, and at greater than 0.7, on the contrary, the rapid-hardening feature may often appear, failing to make sure pot life. The Fe$_2$O$_3$ content of the CFA compound should be preferably 0.5 to 15%, more preferably 1 to 12%, and most preferably 3 to 10%. At less than 0.5%, there may often a lot of unreacted aluminum oxide remaining upon heat treatment, which does not only make the formation reaction of calcium ferroaluminate unlikely to keep on going but also gives rise to rapid-hardening features in high-temperature environments, ending up with a lowering of workability and a worsening of resistance to penetration of chloride ions. At greater than 15%, on the contrary, the effect on keeping the reaction on going efficiently levels off, and the resistance to penetration of chloride ions tends to go worse too.

The fineness of the CFA compound should be preferably 2,000 to 7,000 cm$^2$/g, more preferably 3,000 to 6,000 cm$^2$/g, and most preferably 4,000 to 5,000 cm$^2$/g as represented in terms of the Blaine's specific area value (hereinafter called the Blaine's value). If the CFA compound is in coarse particle form, no sufficient resistance to penetration of chloride ions may often be obtained, and if the CFA compound in powder form finer than 7,000 cm$^2$/g, there may often be the rapid-hardening feature appearing, resulting in a failure to make sure pot life.

The raw materials used to prepare the CFA compound will now be explained.

By way of example but not by way of limitation, the CaO-containing raw material includes quick lime (CaO), hydrated lime (Ca(OH)$_2$) and limestone (CaCO$_3$), all commercially available as industrial materials.

By way of example but not by way of limitation, the Al$_2$O$_3$-containing raw material includes Al$_2$O$_3$, aluminum hydroxide and bauxite, all commercially available as industrial materials, among which bauxite is more desirable because of containing both Al$_2$O$_3$ and Fe$_2$O$_3$.

By way of example but not by way of limitation, the iron-containing raw material includes Fe$_2$O$_3$ obtained from the pulverization, processing and refinement of iron ore, and Fe$_2$O$_3$ obtained through the recovery and refinement of waste hydrochloric acid upon steel scrubbing, all commercially available as industrial materials. FeO, Fe$_3$O$_4$, and even pure iron, if heat treated in an oxidizing atmosphere, may be used too.

These iron-containing raw materials may be used in combination with, for instance, SiO$_2$ and R$_2$O (R is an alkaline metal) without detrimental to the object of the invention.

The CFA compound may be obtained by mixing together the CaO-containing raw material, the $Al_2O_3$-containing raw material, the iron-containing raw material, etc., and firing the resultant mixture in a kiln, fusing it in an electric furnace or otherwise heat treating it. Although depending on the blend of the raw materials, the heat-treatment temperature should be preferably 1,400 to 1,600° C. inclusive, and more preferably 1,450 to 1,550° C. inclusive. At lower than 1,400° C., it is less likely that the reaction involved keeps on going efficiently, leaving some $Al_2O_3$ unreacted and rendering it impossible to obtain calcium ferroaluminate. At higher than 1,600° C., on the contrary, it is often likely that the raw materials may stick up, rendering operation difficult and giving rise to a worsening of energy efficiency.

In the present invention, the CFA compound having a CaO/$Al_2O_3$ molar ratio of 0.15 to 0.7 and a $Fe_2O_3$ content of 0.5 to 20% may be used in combination with the potentially hydraulic substance and/or pozzolan substance for the purpose of maintaining sufficient rustproofness, resistance to penetration of chloride ions and the effect on keeping Ca ions from leaching, enhancing initial strength, and improving the self-recovery capability.

Specifically but not exclusively, the potentially hydraulic substance and/or pozzolan substance used herein include finely pulverized, quenched, granulated blast-furnace slag, fly ash, silica fume, metakaolin, incinerated pulp sludge ash, incinerated sewage sludge ash, and waste glass powder. In order to make further enhancement of the aforesaid effects, finely pulverized, quenched, granulated blast-furnace slag, fly ash, silica fume, and metakaolin is preferred.

Specifically but not exclusively, the proportion of the CFA compound blended with the potentially hydraulic substance and/or pozzolan substance should be preferably 10/1 to 1/10 by mass, and more preferably 5/1 to 1/5 by mass.

If the blending proportion of the CFA compound to the pozzolan substance (potentially hydraulic substance) is set in the aforesaid range, the sufficient rustproofness, the resistance to penetration of chloride ions, the effect on inhibition of leaching of Ca ions, and the self-recovery capability are much more improved than the CFA compound is used alone.

The cement used herein includes a variety of Portland cements such as normal Portland cement, high-early strength Portland cement, super-early strength Portland cement, low-heat Portland cement and moderate-heat Portland cement; a variety of mixed cements of those Portland cements with blast-furnace slag, fly ash or silica; filler cements mixed with limestone powders, finely pulverized, cooled-down blast-furnace slag; and Portland cements such as environmentally friendly cements (eco-cements) produced using incinerated municipal garbage ash, and incinerated sewage sludge ash as the raw material, which may be used alone or two or more.

Specifically but not exclusively, when only the calcium ferroaluminate compound is used as the cement admixture, the amount of the cement admixture is preferably 1 to 15 parts, and more preferably 2 to 12 parts per 100 parts of the cement composition composed of cement and the cement admixture. As the amount of the cement admixture used is smaller, it may often provide none of the sufficient rustproofness, the resistance to penetration of chloride ions and the effect on prevention of leaching of Ca ions, and excessive use may often cause the rapid-hardening feature to appear, failing to make sure sufficient pot life. When the calcium ferroaluminate compound and the potentially hydraulic substance and/or pozzolan substance are used as the cement admixture, the cement admixture is used in an amount of preferably 1 to 50 parts, and more preferably 5 to 30 parts per 100 parts of the cement composition made up of cement and the cement admixture. As the amount of the cement admixture used is smaller, it may often provide none of the sufficient rustproofness, the resistance to penetration of chloride ions and the effect on prevention of leaching of Ca ions, and excessive use may often cause the rapid-hardening feature to appear, failing to make sure sufficient pot life.

In the present invention, cement is blended with the cement admixture or the CFA compound into a cement composition.

In the cement composition of the invention, the water/binder ratio should be preferably 25 to 70%, and more preferably 30 to 65%. A smaller amount of water may often cause a lowering of pump delivery or workability, shrinkage or the like, and too much water may often render the ability to develop strength lower. The "binder" herein refers to the cement and CFA compound combined.

In the cement admixture or cement composition of the invention, the respective materials may be mixed on site or may have been partly or wholly mixed together.

In the present invention, the cement and cement admixture as well as fine aggregates such as sand and coarse aggregates such as gravel may be used in combination with one or two or more in the group consisting of expanding materials, rapid-hardening mortar-accelerators, water-reducing agents, AE water-reducing agents, AE water-reducing agents, high-performance water-reducing agents, high-performance AE water-reducing agents, defoamers, thickeners, conventional rustproofing agents, antifreezers, shrinkage-reducing agents, hardening modifiers, clay minerals such as bentonite, anion exchangers such as hydrotalcite, slag such as finely pulverized, quenched, granulated blast-furnace slag and finely pulverized, cooled-down blast-furnace slag and admixture materials such as finely pulverized limestone without substantial detrimental to the object of the invention.

The mixing apparatus used may be any one of exiting mixers such as tilting mixers, omini mixers, Henschel mixers, V-type mixers, and Nauta mixers.

More specifically but not exclusively, the present invention will now be explained with reference to inventive and comparative examples.

EXAMPLES

Identification of the Compound's Crystal Structure

Synthesized were calcium ferrite ($C_2F$), calcium aluminoferrites $C_6A_2F, C_6AF_2$), calcium ferro-aluminate and calcium alluminate ($CA_2$).

Figure 1:
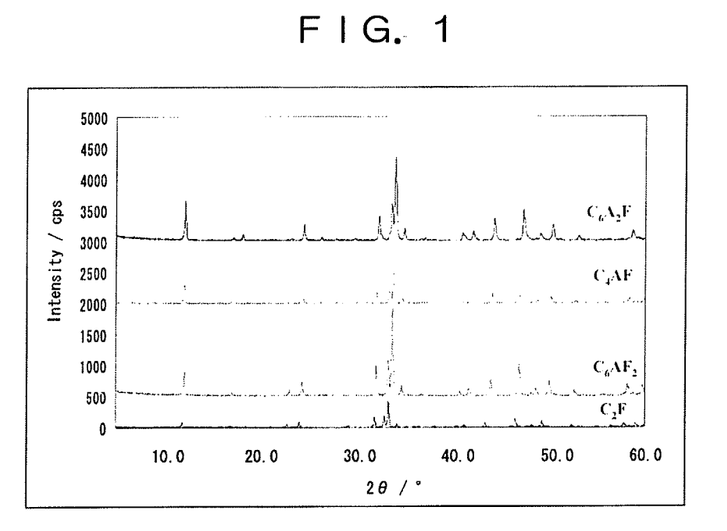
FIG. 1 is an XRD diagram for calcium ferrite and calcium aluminoferrite.

Shown in FIG. 1 are XRD diagrams for calcium ferrite ($C_2F$) and calcium aluminoferrites $C_6A_2F, C_6AF_2$), from which it is found that these compounds have the same crystal structure.

Figure 2:
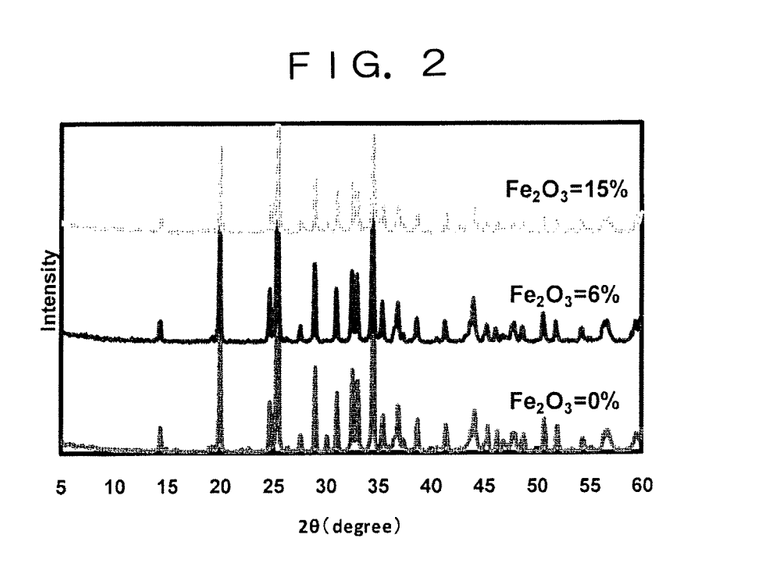
FIG. 2 is an XRD diagram for calcium ferroaluminate and calcium aluminate.

Shown in FIG. 2, on the other hand, are XRD diagrams for calcium ferroaluminate and calcium aluminate ($CA_2$), from which it can be seen that in the calcium ferro-aluminate, $Fe_2O_3$ is solid-solubilized while keeping the $CA_2$ structure intact. It can also be seen that as $Fe_2O_3$ exceeds 15%, there is no solid solubilization taking place, resulting in precipitation of magnetite. It has thus been demonstrated that the calcium ferroaluminate is a compound quite different from calcium aluminoferrite that is a $CaO$—$Al_2O_3$—$Fe_2O_3$ system compound known so far in the art.

Experimental Example 1

Primary reagent calcium carbonate and primary reagent aluminum oxide were blended together in such molar ratios as set out in Table 1 on an oxide basis, and primary reagent iron oxide was blended to the mixture in such $Fe_2O_3$ contents as set out in Table 1 for firing of the resulting mixture in an electric furnace. A blend having a CaO/Al$_2$O$_3$ molar ratio of 0.7, a blend having a CaO/Al$_2$O$_3$ molar ratio of 0.6, a blend having a CaO/Al$_2$O$_3$ molar ratio of 0.4, and a blend having a CaO/Al$_2$O$_3$ molar ratio of 0.15 were fired at 1,400° C., 1,450° C., 1,500° C., and 1,550° C., respectively, for 3 hours, and then cooled down for synthesis. The samples were all adjusted to a Blaine's value of 4,000 cm$^2$/g. For the purpose of comparison, a sample which was free of iron oxide, a sample which contained SiO$_2$, and a sample which contained R$_2$O were likewise synthesized. Whether or not there were unreacted matters were estimated by means of X-ray diffraction. The results are set out in Table 1.

Estimation by X-Ray Diffraction

Cross X indicates that the diffraction peak for unreacted matters (aluminum oxide) was clearly identified; triangle Δ indicates that there is a little peak identified; and circle ○ indicates that no peak was identified.

TABLE 1

| Ex. No. | CaO/Al$_2$O$_3$ Molar Ratio | Fe$_2$O$_3$ (%) | Identification by XRD |
|---|---|---|---|
| 1-1 | 0.15 | 0.5 | ○ |
| 1-2 | 0.15 | 1 | ○ |
| 1-3 | 0.15 | 3 | ○ |
| 1-4 | 0.15 | 10 | ○ |
| 1-5 | 0.15 | 12 | ○ |
| 1-6 | 0.15 | 15 | ○ |
| 1-7 | 0.4 | 0.5 | ○ |
| 1-8 | 0.4 | 1 | ○ |
| 1-9 | 0.4 | 3 | ○ |
| 1-10 | 0.4 | 10 | ○ |
| 1-11 | 0.4 | 12 | ○ |
| 1-12 | 0.4 | 15 | ○ |
| 1-13 | 0.6 | 0.5 | ○ |
| 1-14 | 0.6 | 1 | ○ |
| 1-15 | 0.6 | 3 | ○ |
| 1-16 | 0.6 | 10 | ○ |
| 1-17 | 0.6 | 12 | ○ |
| 1-18 | 0.6 | 15 | ○ |
| 1-19 | 0.7 | 0.5 | ○ |
| 1-20 | 0.7 | 1 | ○ |
| 1-21 | 0.7 | 3 | ○ |
| 1-22 | 0.7 | 10 | ○ |
| 1-23 | 0.7 | 12 | ○ |
| 1-24 | 0.7 | 15 | ○ |
| 1-25 | 0.15 | 0 | X |
| 1-26 | 0.4 | 0 | X |
| 1-27 | 0.6 | 0 | X |
| 1-28 | 0.7 | 0 | Δ |
| 1-29 | 0.4 | 3* | X |
| 1-30 | 0.4 | 3** | X |

*Silicon oxide was added instead of iron oxide.
**Instead of iron oxide, sodium carbonate was added in an amount of 3% as calculated on a Na$_2$O basis.

From Table 1, it is found that the incorporation of iron enables the CFA compounds to be synthesized without leaving some alumina unreacted yet with high energy efficiency.

Referring here to the iron-free samples, the diffraction peak for unreacted aluminum oxide disappeared by firing the sample having a CaO/Al$_2$O$_3$ molar ratio of 0.7 at 1,500° C. or higher, the sample having a CaO/Al$_2$O$_3$ molar ratio of 0.6 at 1,550° C. or higher, the sample having a CaO/Al$_2$O$_3$ molar ratio of 0.4 at 1,600° C. or higher, and the sample having a CaO/Al$_2$O$_3$ molar ratio of 0.15 at 1,650° C. or higher.

Experimental Example 2

The CFA compounds set out in Table 2 were each blended with cement in an amount of 7 parts per 100 parts of cement and the CFA compound to prepare a cement composition, and a mortar sample having a water/binder ratio of 0.5 was prepared according to JIS R 5201. This mortar sample was measured in terms of hardening time, rustproofness, compressive strength, depth of penetration of chlorides, leaching of Ca ions and resistance to sulfate attack. The results are also set out in Table 2. Note here that the tests were carried out in an environment of 30° C.

CAF Compounds

CFA Compound A
  Primary reagent calcium carbonate and primary reagent aluminum oxide were blended together in a given proportion, and primary reagent iron oxide was further blended with the mixture in such a way as to provide a Fe$_2$O$_3$ content of 3%. As in Experimental Example 1, the blend was fired at 1,550° C. in an electric furnace, and cooled down for synthesis. The CaO/Al$_2$O$_3$ molar ratio was 0.1, and the Blaine's value was 4,000 cm$^2$/g.

CFA Compound B
  Experiment No. 1-3; the CaO/Al$_2$O$_3$ molar ratio was 0.15, the Fe$_2$O$_3$ content was 3%, and the Blaine's value was 4,000 cm$^2$/g.

CFA Compound C
  Experiment No. 1-9; the CaO/Al$_2$O$_3$ molar ratio was 0.4, the Fe$_2$O$_3$ content was 3%, and the Blaine's value was 4,000 cm$^2$/g.

CFA Compound D
  Experiment No. 1-15; the CaO/Al$_2$O$_3$ molar ratio was 0.6, the Fe$_2$O$_3$ content was 3%, and the Blaine's value was 4,000 cm$^2$/g.

CFA Compound E
  Experiment No. 1-21; the CaO/Al$_2$O$_3$ molar ratio was 0.7, the Fe$_2$O$_3$ content was 3%, and the Blaine's value was 4,000 cm$^2$/g.

CFA Compound F
  This compound was synthesized by firing at 1,400° C. in an electric furnace, and cooling down; the CaO/Al$_2$O$_3$ molar ratio was 0.9, the Fe$_2$O$_3$ content was 3%, and the Blaine's value was 4,000 cm$^2$/g.

CFA Compound G
  Experiment No. 1-26; the CaO/Al$_2$O$_3$ molar ratio was 0.4, and the Blaine's value was 4,000 cm$^2$/g.

CFA Compound H
  Experiment No. 1-29; the CaO/Al$_2$O$_3$ molar ratio was 0.4, the SiO$_2$ content was 3%, and the Blaine's value was 4,000 cm$^2$/g.

CFA Compound I
  Experiment No. 1-30; the CaO/Al$_2$O$_3$ molar ratio was 0.4, the Na$_2$O content was 3%, and the Blaine's value was 4,000 cm$^2$/g.

Cement
  Commercially available normal Portland cement
Fine Aggregate
  Standard sand used according to JIS R 5201
Water
  Tap Water Estimations For the hardening time, when hardening came to an end was measured according to JIS R 5201.

For the rustproofing effect (rustproofness), there was accelerated testing performed in which chloride ions were incorporated as intrinsic chloride ions in a mortar sample at a concentration of 10 kg/m$^3$, and a round steel rebar was placed in it for heated aging at 50° C. No rusting of the rebar was estimated to be good; rusting of the rebar within an area of 1/10 acceptable; and rusting of the rebar beyond an area of 1/10 unacceptable.

For the compressive strength, the compressive strength of the sample was measured after the lapse of one day and 28 days according to JIS R 5201.

For the depth of penetration of chlorides, the resistance to penetration of chloride ions was estimated. More specifically, a columnar mortar sample of 10 cmϕ×20 cm was aged in water of 30° C. until a material age of 28 days. After the sample was immersed in pseudo-seawater that was a brine of 30° C. having a salt concentration of 3.5% for 12 weeks, the depth of penetration of chlorides was measured. A portion in section of the mortar sample that did not turned brown in the fluorosceine-silver nitrate method was regarded as the depth of penetration of chlorides, and 8 measurements taken by slide calipers were averaged.

For the leaching of Ca ions, a mortar sample of 4×4×16 cm was immersed in 10-liter pure water for 28 days to measure the concentration of Ca ions dissolved in a liquid phase.

For the resistance to sulfate attack, a mortar sample of 4×4×16 cm was immersed in a 10% $Na_2SO_4$ solution for 25 weeks to measure the expansion coefficient.

TABLE 2

| Ex. No. | CFA Compounds | Hardening Time (min.) | Rustproofness | Compressive Strength (N/mm²) | |
|---|---|---|---|---|---|
| | | | | 1 day | 28 days |
| 2-1 | — | 180 | Unacceptable | 12.7 | 53 |
| 2-2 | A | 180 | Acceptable | 10.5 | 48 |
| 2-3 | B | 165 | Good | 10.3 | 53 |
| 2-4 | C | 150 | Good | 10.5 | 55 |
| 2-5 | D | 95 | Good | 10.5 | 55 |
| 2-6 | E | 60 | Good | 10.8 | 54 |
| 2-7 | F | 3 | * | * | * |
| 2-8 | G | 30 | Good | 5.7 | 49 |
| 2-9 | H | 40 | Unacceptable | 4.3 | 42 |
| 2-10 | I | ** | ** | ** | ** |

| Ex. No. | Depth of Penetration of Chlorides (mm) | Leaching of Ca Ions (mg/l) | Resistance to Sulfate Attack (%) | Remarks |
|---|---|---|---|---|
| 2-1 | 20 | 130 | 0.18 | Comparative |
| 2-2 | 14 | 106 | 0.10 | Comparative |
| 2-3 | 9 | 41 | 0.07 | Inventive |
| 2-4 | 2 | 40 | 0.01 | Inventive |
| 2-5 | 3 | 42 | 0.02 | Inventive |
| 2-6 | 5 | 44 | 0.02 | Inventive |
| 2-7 | * | * | * | Comparative |
| 2-8 | 17 | 103 | 0.10 | Comparative |
| 2-9 | 16 | 99 | 0.12 | Comparative |
| 2-10 | ** | ** | ** | Comparative |

No cement admixture was used in Experiment No. 2-1.
*: No sample could not be prepared because of rapid-hardening.
**: The sample was set in about 4 minutes because its fluidity dropped.

For the rustproofness, no rusting of the rebar was estimated to be good; rusting of the rebar within an area of 1/10 acceptable; and rusting of the rebar beyond an area of 1/10 unacceptable.

As can be seen from Table 2, if CFA compounds B, C, D and E having a $CaO/Al_2O_3$ molar ratio of 0.15 to 0.7 and containing iron ($Fe_2O_3$) are used as the cement admixture (Experiment Nos. 2-3 to 2-6), sufficient work time could be ensured even in high-temperature environments in particular, and the rustproofing effect and the resistance to penetration of chloride ions could be maintained much more, not only with prevention of a lowering of initial strength but also with improvements in the effect on inhibition of leaching of Ca ions and the resistance to sulfate attack, sharply contrast to Experiment No. 2-1 where no CFA compound was used. In particular, CFA compounds C and D having a $CaO/Al_2O_3$ molar ratio of 0.4 to 0.6 would be preferable. The use of CFA compound A containing iron but having a $CaO/Al_2O_3$ molar ratio of 0.1 (Experiment No. 2-2), and compound G having a $CaO/Al_2O_3$ molar ratio of 0.4 but containing no iron (compound G is conveniently classified as the CFA compound in Table 2, although it belongs to the CA compound) (Experiment No. 2-8) resulted in a lowering of the resistance to penetration of chloride ions because of an insufficient effect on inhibition of leaching of Ca ions. The use of CFA compound F having a $CaO/Al_2O_3$ molar ratio of 0.9 (Experiment No. 2-7) made it impossible to ensure pot life due to rapid hardening.

The use of compound H containing $SiO_2$ instead of $Fe_2O_3$ (compound H is conveniently classified as the CFA compound in Table 2, although it does not belong to the CFA compound) (Experiment No. 2-9) made the rustproofing effect poor, gave rise to a lowering of initial strength, and failed to obtain sufficient resistance to penetration of chloride ions and sufficient effects on inhibition of leaching of Ca ions with a lowering of resistance to sulfate attack.

The use of compound I containing $Na_2O$ instead of $Fe_2O_3$ (compound I is conveniently classified as the CFA compound in Table 2, although it does not belong to the CFA compound) (Experiment No. 2-9) results in a lowering of fluidity within a short period of time leading to early setting of the cement composition.

Experimental Example 3

Experimental Example 2 was repeated with the exception of combined use of the CFA compound that was synthesized by blending together primary reagent calcium carbonate and primary reagent aluminum oxide in a $CaO/Al_2O_3$ molar ratio of 0.4, blending the mixture with primary reagent iron oxide in such a way as to provide the contents of $Fe_2O_3$ set out in Table 3, and firing the blend in an electric furnace as in Example 1, followed by cooling down. The results are also set out in Table 3.

TABLE 3

| Ex. No. | $Fe_2O_3$ (%) | Hardening Time (min.) | Rustproofness | Compressive Strength (N/mm²) | |
|---|---|---|---|---|---|
| | | | | 1 day | 28 days |
| 2-8 | 0 | 30 | Good | 5.7 | 49 |
| 3-1 | 0.5 | 90 | Good | 9.0 | 51 |
| 3-2 | 1 | 120 | Good | 10.5 | 53 |
| 2-4 | 3 | 150 | Good | 10.5 | 55 |
| 3-3 | 5 | 170 | Good | 10.5 | 53 |
| 3-4 | 7 | 180 | Good | 10.5 | 55 |
| 3-5 | 10 | 190 | Good | 10.8 | 54 |
| 3-6 | 15 | 190 | Good | 10.6 | 52 |
| 3-7 | 20 | 190 | Acceptable | 9.8 | 47 |

| Ex. No. | Depth of Penetration of Chlorides (mm) | Leaching of Ca Ions (mg/l) | Resistance to Sulfate Attack (%) | Remarks |
|---|---|---|---|---|
| 2-8 | 17 | 103 | 0.10 | Comparative |
| 3-1 | 6 | 44 | 0.08 | Inventive |
| 3-2 | 4 | 43 | 0.05 | Inventive |
| 2-4 | 2 | 40 | 0.01 | Inventive |
| 3-3 | 3 | 42 | 0.02 | Inventive |
| 3-4 | 2 | 40 | 0.01 | Inventive |
| 3-5 | 4 | 44 | 0.02 | Inventive |
| 3-6 | 5 | 43 | 0.02 | Inventive |
| 3-7 | 11 | 99 | 0.02 | Comparative |

As can be seen from Table 3, if the CFA compounds containing iron in an amount of 0.5 to 15% by mass are used as the cement admixture (Experiment Nos. 3-1 to 3-6), sufficient work times could be ensured even in high-temperature environments in particular, and the rustproofing effect and the resistance to penetration of chloride ions could be maintained much more, not only with prevention of a lowering of initial strength, but also with improvements in the effect on inhibition of leaching of Ca ions and the resistance to sulfate attack, sharply contrast to Experiment No. 2-8 where the iron-free CA compound was used. The use of the CFA compound containing iron in an amount of 20% by mass (Experiment No. 3-7) failed to obtain sufficient resistance to penetration of chloride ions and sufficient effects on inhibition of leaching of Ca ions.

Experimental Example 4

Experimental Example 2 was repeated with the exception of using CFA compound D whose fineness is set out in Table 4. The results are also set out in Table 4.

TABLE 4

| Ex. No. | Fineness of the CFA compound (cm²/g) | Rustproofness | Compressive Strength (28 days) (N/mm²) |
| --- | --- | --- | --- |
| 4-1 | 2,000 | Acceptable | 51 |
| 4-2 | 3,000 | Good | 53 |
| 2-5 | 4,000 | Good | 55 |
| 4-3 | 5,000 | Good | 55 |
| 4-4 | 6,000 | Good | 55 |
| 4-5 | 7,000 | Good | 54 |

| Ex. No. | Depth of Penetration of Chlorides (mm) | Leaching of Ca Ions (mg/l) | Resistance to Sulfate Attack (%) | Remarks |
| --- | --- | --- | --- | --- |
| 4-1 | 5 | 60 | 0.10 | Inventive |
| 4-2 | 3 | 49 | 0.04 | Inventive |
| 2-5 | 3 | 42 | 0.02 | Inventive |
| 4-3 | 2 | 45 | 0.02 | Inventive |
| 4-4 | 3 | 44 | 0.02 | Inventive |
| 4-5 | 7 | 51 | 0.04 | Inventive |

For rustproofness, no rusting of the rebar was estimated to be good; rusting of the rebar within an area of ¹⁄₁₀ acceptable; and rusting of the rebar beyond an area of ¹⁄₁₀ unacceptable.

As can be seen from Table 4, if the fineness of the CFA compound is adjusted for the cement admixture, the rustproofing effect (rustproofness) and the resistance to penetration of chloride ions could then be maintained much more, not only with prevention of a lowering of strength, but also with improvements in the effect on inhibition of leaching of Ca ions and the resistance to sulfate attack. The fineness of the CFA compound would be preferably 2,000 to 7,000 cm²/g, more preferably 3,000 to 6,000 cm²/g, and most preferably 4,000 to 5,000 cm²/g.

Experimental Example 5

Experimental Example 2 was repeated with the exception that CFA compound D was used in the amounts set out in Table 5. For the purpose of comparison, similar experimentation was carried out using conventional rustproofing materials. The results are also set out in Table 5.

Conventional Rustproofing Materials
I: Commercially available lithium nitrite
II: Commercially available nitrite-type hydrocalumite

TABLE 5

| Ex. No. | CFA Compound D (parts) | Rustproofness | Compressive Strength (28 days) (N/mm²) |
| --- | --- | --- | --- |
| 2-1 | 0 | Unacceptable | 53 |
| 5-1 | 1 | Acceptable | 53 |
| 5-2 | 2 | Good | 54 |
| 5-3 | 3 | Good | 55 |
| 5-4 | 5 | Good | 55 |
| 2-5 | 7 | Good | 55 |
| 5-5 | 10 | Good | 55 |
| 5-6 | 12 | Good | 54 |
| 5-7 | 15 | Good | 53 |
| 5-8 | *I10 | Acceptable | 39 |
| 5-9 | *II10 | Acceptable | 34 |

| Ex. No. | Depth of Penetration of Chlorides (mm) | Leaching of Ca Ions (mg/l) | Resistance to Sulfate Attack (%) | Remarks |
| --- | --- | --- | --- | --- |
| 2-1 | 20 | 130 | 0.18 | Comparative |
| 5-1 | 10 | 84 | 0.10 | Inventive |
| 5-2 | 7 | 55 | 0.10 | Inventive |
| 5-3 | 5 | 49 | 0.07 | Inventive |
| 5-4 | 4 | 46 | 0.03 | Inventive |
| 2-5 | 3 | 42 | 0.02 | Inventive |
| 5-5 | 3 | 45 | 0.02 | Inventive |
| 5-6 | 5 | 51 | 0.02 | Inventive |
| 5-7 | 7 | 59 | 0.02 | Inventive |
| 5-8 | 14 | 119 | 0.16 | Comparative |
| 5-9 | 17 | 128 | 0.17 | Comparative |

The amount of the CFA compound is given by parts per 100 parts of the cement composition composed of cement and the CFA compound.
In Experiment No. 2-1, there was no cement admixture used.
*Convention rustproofing material is used.

For rustproofness, no rusting of the rebar is estimated to be good; rusting of the rebar within an area of ¹⁄₁₀ acceptable; and rusting of the rebar beyond an area of ¹⁄₁₀ unacceptable.

As can be seen from Table 5, if the amount of the CFA compound used is adjusted for the cement admixture, the rustproofing effect (rustproofness) and the resistance to penetration of chloride ions could then be maintained much more, not only with prevention of a lowering of strength, but also with improvements in the effect on inhibition of leaching of Ca ions and the resistance to sulfate attack.

From Table 5, it is found that when only the calcium ferroaluminate compound is used as the cement admixture, it should be used in an amount of preferably 1 to 15 parts, and more preferably 2 to 12 parts per 100 parts of the cement composition composed of cement and the cement admixture.

Experimental Example 6

The CFA compounds having such varying $CaO/Al_2O_3$ molar ratios as set out in Table 6 were mixed with the potentially hydraulic substance and/or pozzolan substance I at a mass ratio of 1/2 into cement admixtures. This cement admixture was used with cement to prepare a cement composition containing 21 parts of the cement admixture per 100 parts of the cement composition, and a mortar sample having a water/binder ratio of 0.5 was prepared according to JIS R 5201. This mortar sample was measured in terms of rustproofness, compressive strength, depth of penetration of chlorides, leaching of Ca ions and self-recovery capability. The results are also set out in Table 6.

Potentially Hydraulic Substance and/or Pozzolan Substance I
Finely pulverized, quenched, granulated blast-furnace slag commercially available in the art and having a Blaine's value of 4,000 cm²/g Estimation of Self-Recovery Capability There was a mortar sample of 10×10×40 cm prepared with which 6-mm nylon fibers were mixed in an amount of 0.15% by mass, and a 0.3 mm-wide crack was introduced by bending stress in it. After the sample was immersed in pseudo-seawater for 180 days, the crack width was measured. Double circle ⊚ indicates that the crack was fully closed up; circle ○ indicates that the crack width narrowed down to 0.1 mm or less; triangle Δ indicates that the crack width narrowed down to about 0.2 mm, and cross X indicates that the crack width did not narrow at all or, conversely, it widened.

TABLE 6

| Ex. No. | CFA Compound | Rustproofness | Compressive Strength (N/mm²) 1 day | 28 days |
|---|---|---|---|---|
| 2-1 | — | Unacceptable | 12.7 | 53 |
| 6-1 | A | Acceptable | 12.8 | 52 |
| 6-2 | B | Good | 13.0 | 56 |
| 6-3 | C | Good | 14.1 | 59 |
| 6-4 | D | Good | 15.0 | 59 |
| 6-5 | E | Good | 14.5 | 58 |
| 6-6 | F | * | * | * |

| Ex. No. | Depth of Penetration of Chlorides (mm) | Leaching of Ca Ions (mg/l) | Self-Recovery Capability | Remarks |
|---|---|---|---|---|
| 2-1 | 20 | 130 | X | Comparative |
| 6-1 | 12 | 100 | X | Comparative |
| 6-2 | 7 | 36 | Δ | Inventive |
| 6-3 | 2 | 37 | ○ | Inventive |
| 6-4 | 1 | 35 | ⊚ | Inventive |
| 6-5 | 3 | 39 | ○ | Inventive |
| 6-6 | * | * | * | Comparative |

In Experiment No. 2-1, there was no cement admixture used.
*: No sample could be prepared due to rapid hardening.

As can be seen from Table 6, if CFA compound B, C, D, and E of the invention having a CaO/Al$_2$O$_3$ molar ratio of 0.15 to 0.7 is used in combination with the potentially hydraulic substance and/or pozzolan substance (Experiment Nos. 6-2 to 6-5), the rustproofing effect (rustproofness) and the resistance to penetration of chloride ions could then be improved not only with an increased initial strength but also with improvements in the effect on inhibition of leaching of Ca ions as well as the self-recovery capability, sharp contrast to the comparative example where both are not used (Experiment No. 2-1). CFA compounds C and D having a CaO/Al$_2$O$_3$ molar ratio of 0.4 to 0.6 would be particularly preferred. With CFA compound A having a CaO/Al$_2$O$_3$ molar ratio of 0.1 (Experiment No. 6-1), both the resistance to penetration of chloride ions and the effect on inhibition of leaching of Ca ions remained insufficient with a lowering of the self-recovery capability, and with CFA compound F having CaO/Al$_2$O$_3$ molar ratio of 0.9 (Experiment No. 6-6), pot life was not ensured because of rapid hardening.

Experimental Example 7

Experimental Example 6 was repeated with the exception of using the CFA compounds set out in Table 7 to with varying Fe$_2$O$_3$ contents in combination with the potentially hydraulic substance and/or pozzolan substance I. The results are also set out in Table 7.

CFA Compounds

CFA Compound J

Primary reagent calcium carbonate and primary reagent aluminum oxide were blended together in a given proportion with addition of primary reagent iron oxide in a Fe$_2$O$_3$ content of 0.5%. Then, the mixture was fired at 1,450° C. in an electric furnace, and finally cooled down for synthesis. The CaO/Al$_2$O$_3$ molar ratio was 0.6, and the Blaine's value was 4,000 cm$^2$/g.

CFA Compound K

Primary reagent calcium carbonate and primary reagent aluminum oxide were blended together in a given proportion with addition of primary reagent iron oxide in a Fe$_2$O$_3$ content of 1%. Then, the mixture was fired at 1,450° C. in an electric furnace, and finally cooled down for synthesis. The CaO/Al$_2$O$_3$ molar ratio was 0.6, and the Blaine's value was 4,000 cm$^2$/g.

CFA Compound L

Primary reagent calcium carbonate and primary reagent aluminum oxide were blended together in a given proportion with addition of primary reagent iron oxide in a Fe$_2$O$_3$ content of 7%. Then, the mixture was fired at 1,450° C. in an electric furnace, and finally cooled down for synthesis. The CaO/Al$_2$O$_3$ molar ratio was 0.6, and the Blaine's value was 4,000 cm$^2$/g.

CFA Compound M

Primary reagent calcium carbonate and primary reagent aluminum oxide were blended together in a given proportion with addition of primary reagent iron oxide in a Fe$_2$O$_3$ content of 10%. Then, the mixture was fired at 1,450° C. in an electric furnace, and finally cooled down for synthesis. The CaO/Al$_2$O$_3$ molar ratio was 0.6, and the Blaine's value was 4,000 cm$^2$/g.

CFA Compound N

Primary reagent calcium carbonate and primary reagent aluminum oxide were blended together in a given proportion with addition of primary reagent iron oxide in a Fe$_2$O$_3$ content of 20%. Then, the mixture was fired at 1,450° C. in an electric furnace, and finally cooled down for synthesis. The CaO/Al$_2$O$_3$ molar ratio was 0.6, and the Blaine's value was 4,000 cm$^2$/g.

CFA Compound O

Primary reagent calcium carbonate and primary reagent aluminum oxide were blended together in a given proportion. Then, the mixture was fired at 1,450° C. in an electric furnace in the absence of Fe$_2$O$_3$, and finally cooled down for synthesis. The CaO/Al$_2$O$_3$ molar ratio was 0.6, and the Blaine's value was 4,000 cm$^2$/g.

TABLE 7

| Ex. No. | CFA Compound | Rustproofness | Compressive Strength (N/mm²) 1 day | 28 days |
|---|---|---|---|---|
| 2-1 | — | Unacceptable | 12.7 | 53 |
| 7-1 | J | Acceptable | 12.7 | 53 |
| 7-2 | K | Good | 15.0 | 55 |
| 6-4 | D | Good | 15.0 | 59 |
| 7-3 | L | Good | 15.0 | 55 |
| 7-4 | M | Good | 14.4 | 54 |
| 7-5 | N | Good | 13.9 | 54 |
| 7-6 | O | Acceptable | 7.5 | 50 |

TABLE 7-continued

| Ex. No. | Depth of Penetration of Chlorides (mm) | Leaching of Ca Ions (mg/l) | Self-Recovery Capability | Remarks |
|---|---|---|---|---|
| 2-1 | 20 | 130 | X | Comparative |
| 7-1 | 6 | 49 | ○ | Inventive |
| 7-2 | 2 | 45 | ⊚ | Inventive |
| 6-4 | 1 | 35 | ⊚ | Inventive |
| 7-3 | 2 | 43 | ⊚ | Inventive |
| 7-4 | 3 | 48 | ⊚ | Inventive |
| 7-5 | 4 | 52 | ⊚ | Inventive |
| 7-6 | 8 | 62 | Δ | Comparative |

In Experiment No. 2-1, there was no cement admixture used.

As can be seen from Table 7, if CFA compound D, J, K, L, M, N, and O having a $Fe_2O_3$ content of 0.5 to 20% is used in combination with the potentially hydraulic substance and/or pozzolan substance (Experiment Nos. 6-4 and 7-1 to 7-5), the rustproofing effect (rustproofness) and the resistance to penetration of chloride ions could then be improved not only with an increased initial strength but also with improvements in the effect on inhibition of leaching of Ca ions as well as the self-recovery capability. When CFA compound O having a $Fe_2O_3$ content of 0 (this compound is conveniently classified as the CFA compound in Table 7, although it belongs to the CA compound) was used in combination with the potentially hydraulic substance and/or pozzolan substance (Experiment No. 7-6), the initial strength went down.

Experimental Example 8

Experimental Example 6 was repeated with the exception of using CFA compound D whose finenesses are set out in Table 8 in combination with the potentially hydraulic substance and/or pozzolan substance I. The results are also set out in Table 8.

TABLE 8

| Ex. No. | CFA Compound Fineness (cm²/g) | Rustproofness | Compressive Strength (N/mm²) 1 day | 28 days |
|---|---|---|---|---|
| 8-1 | 2,000 | Acceptable | 12.7 | 55 |
| 8-2 | 3,000 | Good | 14.0 | 57 |
| 6-4 | 4,000 | Good | 15.0 | 59 |
| 8-3 | 5,000 | Good | 14.9 | 60 |
| 8-4 | 6,000 | Good | 15.0 | 59 |
| 8-5 | 7,000 | Good | 14.4 | 58 |

| Ex. No. | Depth of Penetration of Chlorides (mm) | Leaching of Ca Ions (mg/l) | Self-Recovery Capability | Remarks |
|---|---|---|---|---|
| 8-1 | 5 | 46 | ○ | Inventive |
| 8-2 | 2 | 44 | ○ | Inventive |
| 6-4 | 1 | 35 | ⊚ | Inventive |
| 8-3 | 1 | 40 | ⊚ | Inventive |
| 8-4 | 2 | 39 | ⊚ | Inventive |
| 8-5 | 4 | 48 | ○ | Inventive |

As can be seen from Table 8, if the fineness of the CFA compound is adjusted, then the rustproofing effect (rustproofness) and the resistance to penetration of chloride ions could then be maintained not only with prevention of a lowering of strength but also with improvements in the effect on inhibition of leaching of Ca ions as well as the self-recovery capability. The fineness of the CFA compound would be preferably 2,000 to 7,000 cm²/g, more preferably 3,000 to 6,000 cm²/g, and most preferably 4,000 to 5,000 cm²/g.

Experimental Example 6 was repeated with the exception of using CFA compound D in combination with the potentially hydraulic substances and/or pozzolan substances (hereinafter called the pozzolan substances for short). The results are also set out in Table 9.

Pozzolan Substances

Pozzolan Substance II
Commercially available silica fume having a BET specific surface area of 20 m²/g
Pozzolan Substance III
Commercially available fly ash having a Blaine's value of 4,000 cm²/g
Pozzolan Substance IV
Commercially available metakaolin having a BET specific of 10 m²/g
Pozzolan Substance V
Commercially available incinerated pulp sludge ash having a Blaine's value of 4,000 cm²/g
Pozzolan Substance VI
Commercially available incinerated sewage sludge ash having a Blaine's value of 9,000 cm²/g
Pozzolan Substance VII
Commercially available water glass powders having a Blaine's value of 4,000 cm²/g
Pozzlan Substance VIII
Mixture of 50 parts of Pozzolan Substance I and Pozzolan Substance II having a Blaine's value of 10,000 cm²/g

TABLE 9

| Ex. No. | Pozzolan Substance | Rustproofness | Compressive Strength (N/mm²) 1 day | 28 days |
|---|---|---|---|---|
| 6-4 | I | Good | 15.0 | 59 |
| 9-1 | II | Good | 15.2 | 57 |
| 9-2 | III | Good | 14.5 | 54 |
| 9-3 | IV | Good | 14.9 | 57 |
| 9-4 | V | Good | 13.5 | 54 |
| 9-5 | VI | Good | 12.8 | 53 |
| 9-6 | VII | Good | 12.7 | 53 |
| 9-7 | VIII | Good | 14.8 | 56 |

| Ex. No. | Depth of Penetration of Chlorides (mm) | Leaching of Ca Ions (mg/l) | Self-Recovery Capability | Remarks |
|---|---|---|---|---|
| 6-4 | 1 | 35 | ⊚ | Inventive |
| 9-1 | 2 | 42 | ⊚ | Inventive |
| 9-2 | 3 | 50 | ⊚ | Inventive |
| 9-3 | 2 | 48 | ⊚ | Inventive |
| 9-4 | 4 | 56 | ○ | Inventive |
| 9-5 | 5 | 62 | ○ | Inventive |
| 9-6 | 5 | 60 | ○ | Inventive |
| 9-5 | 2 | 40 | ⊚ | Inventive |

As can be seen from Table 9, even with any pozzolan substances, the rustproofing effect (rustproofness) and the resistance to penetration of chloride ions could be maintained not only with prevention of a lowering of strength but also with improvements in the effect on inhibition of leaching of Ca ions as well as the self-recovery capability. In particular, finely pulverized, quenched, granulated blast-furnace slag (pozzolan substance I), silica fume (pozzolan substance II), fly ash (pozzolan substance III), and metakaolin (pozzolan substance IV) would preferably be used.

Experimental Example 10

Experimental example 6 was repeated with the exception that CFA compound D and pozzolan substance I were blended together in the proportions set out in Table 10 into cement admixtures.

TABLE 10

| Ex. No. | CFA compound/pozzolan substance (mass ratio) | Rustproofness | Compressive Strength (N/mm²) |
|---|---|---|---|
| 2-1 | 0/0 | Unacceptable | 53 |
| 10-2 | 1/20 | Acceptable | 54 |
| 10-3 | 1/10 | Good | 56 |
| 10-4 | 1/5 | Good | 55 |
| 6-4 | 1/2 | Good | 59 |
| 10-5 | 2/1 | Good | 54 |
| 10-6 | 5/1 | Good | 54 |
| 10-7 | 10/1 | Good | 52 |
| 10-8 | 20/1 | Acceptable | 51 |
| 10-9 | 1/0 | Acceptable | 54 |

| Ex. No. | Depth of Penetration of Chlorides (mm) | Leaching of Ca Ions (mg/l) | Self-Recovery Capability | Remarks |
|---|---|---|---|---|
| 2-1 | 20 | 130 | X | Comparative |
| 10-2 | 20 | 30 | Δ | Inventive |
| 10-3 | 9 | 37 | ○ | Inventive |
| 10-4 | 4 | 42 | ⊚ | Inventive |
| 6-4 | 1 | 35 | ⊚ | Inventive |
| 10-5 | 2 | 50 | ⊚ | Inventive |
| 10-6 | 3 | 50 | ⊚ | Inventive |
| 10-7 | 7 | 52 | ○ | Inventive |
| 10-8 | 15 | 90 | ○ | Inventive |
| 10-9 | 3 | 42 | X | Comparative |

In Experiment No. 2-1, there was no cement admixture used.

As can be seen from Table 10, if the blending proportion of the CFA compound to the pozzolan substance is set at 1/20 to 20/1 by mass, then the rustproofing effect (rustproofness) and the resistance to penetration of chloride ions could be maintained not only with prevention of a lowering of strength but also with improvements in the effect on inhibition of leaching of Ca ions as well as the self-recovery capability. The aforesaid blending proportion would be preferably 1/10 to 10/1 by mass, and more preferably 1/5 to 5/1 by mass.

Experimental Example 11

Experimental Example 6 was repeated with the exception that CFA compound D was used to prepare cement admixtures (CFA compound D plus pozzolan substance I) in the amounts set out in Table 11. For the purpose of comparison, similar experiments were carried out using conventional rustproofing materials. The results are also set out in Table 11.

TABLE 11

| Ex. No. | Cement Admixture (parts) | Rustproofness | Compressive Strength (N/mm²) |
|---|---|---|---|
| 2-1 | 0 | Unacceptable | 53 |
| 11-1 | 1 | Acceptable | 53 |
| 11-2 | 3 | Good | 54 |
| 11-3 | 5 | Good | 55 |
| 11-4 | 7 | Good | 55 |
| 11-5 | 10 | Good | 55 |
| 11-6 | 15 | Good | 55 |
| 6-4 | 21 | Good | 59 |
| 11-7 | 30 | Good | 53 |
| 11-8 | 50 | Acceptable | 53 |
| 11-9 | **X10 | Acceptable | 39 |
| 11-10 | **Y10 | Acceptable | 34 |

| Ex. No. | Depth of Penetration of Chlorides (mm) | Leaching of Ca Ions (mg/l) | Self-Recovery Capability | Remarks |
|---|---|---|---|---|
| 2-1 | 20 | 130 | X | Comparative |
| 11-1 | 11 | 84 | ○ | Inventive |
| 11-2 | 5 | 55 | ○ | Inventive |
| 11-3 | 3 | 49 | ⊚ | Inventive |
| 11-4 | 2 | 47 | ⊚ | Inventive |
| 11-5 | 2 | 43 | ⊚ | Inventive |
| 11-6 | 2 | 41 | ⊚ | Inventive |
| 6-4 | 1 | 35 | ⊚ | Inventive |
| 11-7 | 8 | 59 | ⊚ | Inventive |
| 11-8 | 10 | 61 | ○ | Inventive |
| 11-9 | 14 | 119 | X | Inventive |
| 11-10 | 17 | 128 | X | Comparative |

The cement admixture was used in an amount (part) per 100 parts of the cement composition made up of cement plus the cement admixture.
**The conventional rustproofing materials were used. No rusting of the rebar is estimated to be good; rusting of the rebar within an area of 1/10 acceptable; and rusting of the rebar beyond an area of 1/10 unacceptable.

As can be seen from Table 11, if the amount of the cement admixture used is adjusted, then the rustproofing effect (rustproofness) and the resistance to penetration of chloride ions could be maintained not only with prevention of a lowering of strength but also with improvements in the effect on inhibition of leaching of Ca ions as well as the self-recovery capability.

From Table 11, it could be found that when the CFA compound and the pozzolan substance are used as the cement admixture, the amount of the cement admixture used would preferably range 1 to 50 parts, and more preferably 5 to 30 parts per 100 parts of the cement composition made up of cement and the cement admixture.

APPLICABILITY TO THE INDUSTRY

The use of the inventive cement admixture could ensure sufficient work times even in high-temperature environments, and make sure good rustproofness and resistance to penetration of chloride ions combined with the effect on inhibition of leaching of Ca ions and resistance to sulfate attack; so it may be well compatible with a wide range of applications inclusive mainly of water-use structures, water tanks, floor slab concrete, etc. in seawaters and rivers in the civil engineering and construction fields.

What is claimed is:

1. A calcium ferroaluminate compound, comprising a $CaO$—$Al_2O_3$—$Fe_2O_3$ system, and having a $Fe_2O_3$ content of 0.5 to 15% by mass and a $CaO.2Al_2O_3$ structure.

2. A cement admixture, characterized by containing a calcium ferroaluminate as recited in claim 1, wherein a $CaO/Al_2O_3$ molar ratio ranges from 0.15 to 0.7.

3. A cement admixture as recited in claim 2, which has a fineness of 2,000 to 7,000 cm²/g as represented in terms of a Blaine's specific surface area value.

4. A cement admixture as recited in claim 2, which further contains a potentially hydraulic substance and/or a pozzolan substance.

5. A cement admixture as recited in claim 4, wherein said potentially hydraulic substance and/or said pozzolan substance contain one or two or more selected from the group consisting of finely pulverized, quenched, granulated blast-furnace slag, fly ash, silica fume, metakaolin, incinerated pulp sludge ash, incinerated sewage sludge ash, and waste glass powder.

6. A cement admixture as recited in claim 4, wherein said calcium ferroaluminate and said potentially hydraulic substance and/or said pozzolan substance are blended together in a blending proportion of 10/1 to 1/10 by mass.

7. A method for manufacturing a cement admixture, characterized in that a CaO-containing raw material, an $Al_2O_3$-containing raw material and an iron-containing raw material are blended together such that a $CaO/Al_2O_3$ molar ratio ranges from 0.15 to 0.7 and an $Fe_2O_3$ content ranges from 0.5% to 15% by mass, and heat treated at 1,400° C. to 1,600° C. inclusive to obtain a clinker, and said clinker is pulverized down to a Blaine's specific surface area value ranging from 2,000 to 7,000 $cm^2/g$.

8. A cement composition which contains cement and a cement admixture as recited in claim 2.

* * * * *